United States Patent
Sipos

(10) Patent No.: US 11,174,344 B2
(45) Date of Patent: Nov. 16, 2021

(54) PROCESS FOR THE PRODUCTION OF A SOLID-STATE POLYMERIZED POLY (TETRAMETHYLENE-2, 5-FURAN DICARBOXYLATE) POLYMER AND POLYMER THUS PRODUCED

(71) Applicant: Furanix Technologies B.V., Amsterdam (NL)

(72) Inventor: Laszlo Sipos, Amsterdam (NL)

(73) Assignee: Furanix Technologies B.V., Amsterdam (NL)

(*) Notice: Subject to any disclaimer, the term of this patent is extended or adjusted under 35 U.S.C. 154(b) by 0 days.

(21) Appl. No.: 16/339,411

(22) PCT Filed: Oct. 5, 2017

(86) PCT No.: PCT/NL2017/050655
§ 371 (c)(1),
(2) Date: Apr. 4, 2019

(87) PCT Pub. No.: WO2018/067007
PCT Pub. Date: Apr. 12, 2018

(65) Prior Publication Data
US 2020/0040134 A1    Feb. 6, 2020

(30) Foreign Application Priority Data
Oct. 5, 2016 (NL) .................. 2017583

(51) Int. Cl.
*C08G 63/672* (2006.01)
*C08G 63/80* (2006.01)

(52) U.S. Cl.
CPC .......... *C08G 63/672* (2013.01); *C08G 63/80* (2013.01); *C08G 2250/00* (2013.01)

(58) Field of Classification Search
CPC .................................... C08G 63/181
USPC ..................................... 528/307
See application file for complete search history.

(56) References Cited

U.S. PATENT DOCUMENTS

| | | | |
|---|---|---|---|
| 2009/0124763 A1* | 5/2009 | Matsuda | C08G 63/16 525/437 |
| 2011/0282020 A1* | 11/2011 | Sipos | C08G 63/60 526/190 |
| 2013/0171397 A1 | 7/2013 | Ghosh et al. | |
| 2014/0204296 A1 | 7/2014 | Mitsui et al. | |
| 2014/0205786 A1 | 7/2014 | Nederburg et al. | |
| 2014/0336349 A1 | 11/2014 | Sipos et al. | |

FOREIGN PATENT DOCUMENTS

| | | |
|---|---|---|
| CN | 104024301 A | 9/2014 |
| EP | 1948709 B1 | 5/2013 |
| WO | 2007/052847 A1 | 5/2007 |
| WO | 2013/062408 A1 | 5/2013 |
| WO | 2014/204296 A1 | 12/2014 |
| WO | 2015/137807 A1 | 9/2015 |

OTHER PUBLICATIONS

Chinese Office Action, Chinese Application No. 201780068403.1, dated Jan. 11, 2021, 14 pages.

* cited by examiner

Primary Examiner — Shane Fang
(74) Attorney, Agent, or Firm — Hoffmann & Baron, LLP

(57) ABSTRACT

A solid-state polymerized poly(tetramethylene-2,5-furandicarboxylate) polymer is produced in a process including: providing a poly (tetramethylene-2,5-furandicarboxylate) polycondensate having a number average molecular weight (Mn) of at least 10,000, as determined by Gel Permeation Chromatography (GPC) using polystyrene as standard, and having a content of carboxylic acid end groups of at most 50 meq/kg; and keeping the poly(tetramethylene-2,5-furandicarboxylate) polycondensate at a temperature in the range of 80 to 140° C. to obtain a semi-crystalline polycondensate; and subjecting the semi-crystalline polycondensate to solid-state polymerization by keeping the semi-crystalline polycondensate at a temperature of at least 140° C. and below its melting point, whilst the semi-crystalline polycondensate is either under a flow of inert gas or under vacuum to obtain the solid-state polymerized poly(tetramethylene-2,5-furandicarboxylate) polymer.

15 Claims, No Drawings

PROCESS FOR THE PRODUCTION OF A SOLID-STATE POLYMERIZED POLY (TETRAMETHYLENE-2, 5-FURAN DICARBOXYLATE) POLYMER AND POLYMER THUS PRODUCED

CROSS-REFERENCE TO RELATED APPLICATIONS

This application is the National Stage of International Application No. PCT/NL2017/050655, filed Oct. 5, 2017, which claims the benefit of Netherlands Application No. NL2017583, filed Oct. 5, 2016, the contents of which is incorporated by reference herein.

FIELD OF THE INVENTION

The present invention relates to a process for the production of a solid-state polymerized poly(tetramethylene-2,5-furandicarboxylate) polymer and to a polymer thus produced.

BACKGROUND OF THE INVENTION

Polymers containing 2,5-furandicarboxylate groups have gained interest as possible replacement for similar polyesters containing terephthalate moieties. The interest is especially aimed at the use of poly(ethylene-2,5-furandicarboxylate) or PEF as potential replacement of poly(ethylene terephthalate) (PET). Little interest has been shown on poly(tetramethylene-2,5-furandicarboxylate), also known as poly(butylene-2,5-furandicarboxylate) or (PBF), as polymer that might replace poly(butylene terephthalate) (PBT).

US 2014/0205786 describes the preparation of a PBF polycondensate. This condensate is used as comparative example to show its inferior behavior in films compared to the behavior of films containing poly(trimethylene-2,5-furandicarboxylate) (PTF) and PEF. The PBF was prepared by contacting dimethyl 2,5-furandicarboxylate with 1,4-butanediol in a molar ratio of 1:2 in the presence of a catalyst at a temperature of about 180° C., followed by heating the mixture to 210° C. Subsequently, vacuum was applied and the temperature was increased to 230° C. and maintained for about 3 hours. A polycondensate was obtained that had a Tg of about 39° C. and a melting point of about 169° C.

In US 2013/0171397 it is described that PBF is very suitable for contact with food. The PBF was prepared from dimethyl 2,5-furandicarboxylate or from 2,5-furandicarboxylic acid. In the preparation of PBF problems were encountered when the polymerization used dimethyl 2,5-furandicarboxylate as starting material. When prepared from the dimethyl ester, the ester was contacted with an equimolar amount of 1,4-butanediol and heated at 220° C. for 7 hours in a reactor. When the mixture became viscous methanol was collected in a trap under vacuum. The polymer thus obtained was cooled and dissolved in DMSO. After dissolving, it was precipitated in methanol. A similar method was applied when 2,5-furandicarboxylic acid was used as starting material. An excess of 1,4-butanediol was used (1.5 mole/mole acid). The starting materials were kept at 220-230° C. for 10 hours. An additional heating step of 10 hours at 250-260° C. was applied. When the reaction mixture became viscous water that was formed was removed by pumping the reactor under vacuum. The viscous polymer was then cooled and dissolved in DMSO. Thereafter the polymer was precipitated in methanol. Properties of PBF reported include a weight average molecular weight (Mw) of 159,000 (determined with SEC-MALLS), a number average molecular weight (Mn) of 47,750, a degree of polymerization (DPn) of 228, a melting point (Tm) of 163° C. and a glass transition temperature (Tg) of 104° C. It is evident that the polydispersity index of the PBF produced is significantly above 3.0, indicating that the polyester is non-uniform with chain lengths varying over a wide range of molecular masses.

Neither in the process according to US 2014/0205786 nor in the method according to US2013/0171397 a solid state polymerization step was applied.

In EP 1948709 PBF is prepared wherein a part of the PBF is subjected to a solid-state polymerization step. According to example 1 of EP1948709 2,5-furandicarboxylic acid was contacted with 1,4-butanediol in a molar ratio of 1:3 at a temperature of 150 and 170° C. for about 4 hours. In a period of about an hour a vacuum of 5 Pa was then applied, and the reaction was continued at 180° C. for an additional 6.5 hours. The polymer thus obtained was dissolved in hexafluoroisopropanol and re-precipitated with methanol. After drying at 60° C. in vacuo, the resulting precipitate was subjected to solid-state polymerization at a temperature of 150° C. to yield a polymer with a degree of polymerization of 285 (determined by GPC using polymethylmethacrylate as standard) corresponding with a number average molecular weight of 59,850. No weight average molecular weight was reported.

Apart from the temperature, EP 1948709 is silent about the conditions under which the solid-state polymerization took place. It does not mention how long the solid-state polymerization step lasted. Further, the document does not mention what parameters are of influence in determining the rate of the solid-state polymerization step.

SUMMARY OF THE INVENTION

It has now been found that the solid-state polymerization rate is increased when the solid-state polymerization step is carried out with a poly(tetramethylene-2,5-furandicarboxylate) that contains a certain content of carboxylic end groups and that has been subjected to a crystallization step. Accordingly, the present invention provides a process for the production of a solid-state polymerized poly(tetramethylene-2,5-furan dicarboxylate) polymer comprising
  providing a poly(tetramethylene-2,5-furandicarboxylate) polycondensate having a number average molecular weight (Mn) of at least 10,000, as determined by Gel Permeation Chromatography (GPC) using polystyrene as standard, and having a content of carboxylic acid end groups of at most 50 meq/kg; and
  keeping the poly(tetramethylene-2,5-furandicarboxylate) polycondensate at a temperature in the range of 80 to 140° C. to obtain a semi-crystalline polycondensate; and
  subjecting the semi-crystalline polycondensate to solid-state polymerization by keeping the semi-crystalline polycondensate at a temperature of at least 140° C. and below its melting point, whilst the semi-crystalline polycondensate is either under a flow of inert gas or under vacuum to obtain the solid-state polymerized poly(tetramethylene-2,5-furandicarboxylate) polymer.

DETAILED DESCRIPTION OF THE INVENTION

The present process uses a polycondensate with a relatively low molecular weight that has been obtained from polycondensation and that has a carboxylic acid end group content of at most 50 meq/kg. It has been found that if the acid end group content is higher, solid-state polymerization does not occur under the conditions described, or the rate of solid-state polymerization is very low. The polycondensate tends to be amorphous. By subjecting the polycondensate to a period of a temperature in the range of 80 to 140° C. the amorphous polycondensate crystallizes which facilitates the solid-state polymerization. The solid-state polymerization step in the process according to the invention is very effective in that it proceeds at a significant rate. Further, the molecular weight attainable is very high, and may exceed 60,000, as determined by Gel Permeation Chromatography (GPC) using polystyrene as standard. Moreover, several prior art processes use a dissolution step and a precipitation step wherein the polymer that results after the polycondensation of the 2,5-furandicarboxylic acid or it diester is first dissolved and subsequently precipitated in methanol. By these steps low molecular weight components in the polycondensation polymer are removed. This means that a loss of material is incurred. Such loss can now be avoided in the process of the present invention, as a dissolution step is not needed and thus may be avoided.

In a first step of the present process a poly(tetramethylene-2,5-furandicarboxylate) polycondensate (hereinafter PBF polycondensate) is provided. This PBF polycondensate can be obtained in a variety of ways. A first manner is similar to the one described in EP 1948709. In this manner 2,5-furandicarboxylic acid (2,5-FDCA) is mixed with 1,4-butanediol and subjected to esterification. In order to ensure that the number of carboxylic acid end groups in the eventual polycondensate does not exceed 50 meq/kg, the molar ratio of 2,5-FDCA to 1,4-butanediol is suitably in the range of 1:1.5 to 1:5, preferably of 1:2 to 1:4. Moreover, water that is formed during the esterification is removed from the reaction mixture so that saponification of the formed esters is avoided. In this way the majority of carboxylic acid groups in 2,5-FDCA will be esterified before the resulting esterification product is subjected to polycondensation. The CEG content of the resulting polycondensate can more easily be brought to a level of below 50 meq/kg. In the esterification 2,5-FDCA and 1,4-butanediol are contacted in the presence or absence of a catalyst. The presence of a catalyst is not required, as the esterification is catalyzed by acid groups, and the acid groups are already supplied by 2,5-FDCA. The esterification is suitably conducted at a temperature in the range 150 to 245° C., preferably from 160 to 245° C., more preferably from 160 to 190° C. At temperatures below 175° C. the esterification proceeds rather slowly. Most preferably, the esterification is conducted in the temperature range of 175 to 210° C. It has been found that at temperatures above 190° C. 1,4-butanediol may react whilst forming of tetrahydrofuran (THF). The THF formed can be easily removed by distillation. As THF forms an azeotrope with water, water can be easily removed together with THF. At temperatures above 175° C., there is a risk that water may not be completely removed and may cause saponification. Thereby the CEG content of the eventual polycondensate may be increased to levels above 50 meq/kg. The product of the esterification comprises bis(4-hydroxybutyl)-2,5-furandicarboxylate. The esterification may be carried out for a period as described in the prior art. That includes that the reaction time may range from 0.5 to 8 hours, preferably from 1 to 6 hours.

The esterification product together with a polycondensation catalyst is reacted under reduced pressure in a polycondensation step. The polycondensation step may be conducted in one or more separate steps. It is possible to bring the esterification product under vacuum, e.g. at a pressure in the range of 0.1 to 10 mbar. Alternatively, the pressure may be reduced in steps, e.g. a first step at a pressure of 100 to 500 mbar followed by a final vacuum step at a pressure in the range of 0.1 to 10 mbar. The temperature in the polycondensation step may range from 180 to 280° C. Suitably the temperature can be raised in the polycondensation step. The polycondensation is preferably continued for a period of 1 to 6 hours. Whereas the excess of 1,4-butanediol has an effect on the polycondensate, the manner in which the polycondensation is carried out is not critical.

As an alternative to the above described manner, the PBF polycondensate may be obtained by the transesterification of a dialkyl ester of 2,5-FDCA with 1,4-butanediol. Suitable dialkyl esters include the di($C_1$-$C_6$-alkyl) esters, in particular the dimethyl and diethyl ester. The molar ratio of the dialkyl ester of 2,5-FDCA to 1,4-butanediol is suitably in the range of 1:1.1 to 1:2.5, preferably from 1:1.3 to 1:2.0. The transesterification is suitably carried out in the presence of a transesterification catalyst. In the transesterification step the alkyl groups are replaced by 4-hydroxybutyl groups. Suitably, the correspondingly formed alkyl alcohol is removed from the reaction mixture. The temperature at which the transesterification is carried out may suitably range from 150 to 250° C., preferably from 160 to 240° C. Since only a little excess of 1,4-butanediol is used in the transesterification the risk of THF formation is minimal. Therefore, the reaction temperature during the transesterification is preferably at least 200° C., more preferably in the range of 205 to 235° C. The transesterification may be carried out for a period as described in the prior art. That includes that the reaction time may range from 0.5 to 6 hours, preferably from 1 to 4 hours. Polycondensation may be carried out as described above for the esterification product from 2,5-FDCA and 1,4-butanediol. In this context it is observed that the carboxylic acid end groups content of the resulting polycondensate will be low, e.g. below 50 meq/kg, as the starting materials do not contain any carboxylic acid end group.

The carboxylic acid end groups are determined by using the titration method according to ASTM D7409, adapted for poly(tetramethylene-2,5-furandicarboxylate). A thus modified method thereof involves the titration of a 4% w/v solution of poly(tetramethylene-2,5-furandicarboxylate) in ortho-cresol with 0.01M KOH in ethanol as titrant to its equivalence point, using 0.5 mg of bromocresol green (2,6-dibromo-4-[7-(3,5-dibromo-4-hydroxy-2-methyl-phenyl)-9,9-dioxo-8-oxa-9λ6-thiabicyclo[4.3.0]nona-1,3,5-trien-7-yl]-3-methyl-phenol) in 0.1 mL ethanol as indicator.

It is observed that the polycondensate that is produced via the reaction of 2,5-FDCA with 1,4-butanediol or via the transesterification of a dialkyl ester of 2,5-FDCA with 1,4-butanediol is suitably used directly as produced and be provided to next step in the process according to the present invention, i.e. without having been subjected to a dissolution step and precipitation step. Thus the poly(tetramethylene-2,5-furandicarboxylate) polycondensate to be subjected to the step of keeping it at a temperature of 80 to 140° C., has suitably been produced from the esterification of 2,5-FDCA with 1,4-butanediol or the transesterification of a dialkyl ester of 2,5-FDCA without having been subjected to a dissolution step and precipitation step.

Transesterification catalysts that may be used in the above-described transesterification include metal oxides, salts and organometallic compounds. Suitable salts include carbonates, halides and carboxylates, such as formates, acetates, propionates, butyrates, benzoates and mixtures thereof. Salts of carboxylic acids with longer carbon chains, such as 6 to 20 carbon atoms can also be used. Examples of such carboxylic acids are lauric acid, stearic acid, octanoic acids, e.g., 2-ethyl-hexanoic acid. Suitable organometallic compounds include alcoholates, such as $C_1$-$C_4$-alkoxides, and glycolates, such as ethyleneglycolate and glycolates having from 1 to 4 methylene groups. Other organometallic compounds are alkyl metal carboxylates, wherein the alkyl moiety or moieties are selected from $C_1$ to $C_6$ alkyl groups and the carboxylates have been derived from $C_1$ to $C_{20}$ carboxylic acids. The metals are suitably selected from zinc, lead, tin, titanium, hafnium, zirconium, calcium, magnesium, strontium and combinations thereof. Although no esterification catalyst is required, it is possible to use the above-mentioned transesterification catalysts in the esterification of 2,5-FDCA and 1,4-butanediol.

As polycondensation catalysts many transesterification catalysts may be used. Suitable polycondensation catalysts include catalysts comprising one or more elements selected from tin, titanium, zinc, antimony, calcium, manganese, cobalt, hafnium, lead, magnesium, aluminum, cerium, zirconium and mixtures thereof. These compounds may be the acetate or carbonate salts of these metals. Alternatively, metal alkoxides, alkyl metal compounds, or other organometallic compounds are also possible. Other suitable catalysts include the oxides and halides of the elements mentioned. Preferred catalysts include titanium alkoxides, antimony acetate, antimony oxide, and antimony glycolate, i.e. the reaction product of antimony oxide and ethylene glycol. The amounts of the polycondensation catalyst are typically in the range of 0.005 mol % to 0.2 mol %, calculated as metal and based on the number of moles of 2,5-furandicarboxylic acid in the starting mixture, preferably in the range of 0.01 to 0.15 mol %. When transition metals are used it appears that some metals perform differently in one valency than in another valency. For instance, tin (IV) salts tend to lead to more colorless polymers than tin (II) salts, whereas tin(II) salts tend to lead to solid state polymerized polymers with higher molecular weights than tin(IV) salts. Preferred transesterification and polycondensation catalysts include zinc acetate, zirconium(IV)butoxide, titanium(IV)butoxide, tin(II)(2-ethylhexanoate), tin(II) acetate, butyl tin(IV)tris(2-ethylhexanoate), dibutyl tin(IV) dilaurate, and tributyl tin(IV) benzoate.

It is apparent that in accordance with the present invention the poly(tetramethylene-2,5-furandicarboxylate) polycondensate has suitably been obtained from one of the methods selected from the group consisting of
(i) the transesterification of a dialkyl 2,5-furandicarboxylate with 1,4-butanediol to obtain a transesterification product and the subsequent polycondensation of the transesterification product; and
(ii) the esterification of 2,5-furandicarboxylic acid with 1,4-butanediol to obtain an esterification product and the subsequent polycondensation of the esterification product. The invention thus also provides a process for the production of a solid-state polymerized poly(tetramethylene-2,5-furandicarboxylate) polymer comprising preparing a poly(tetramethylene-2,5-furandicarboxylate) polycondensate by one of the methods selected from the group consisting of (i) the transesterification of a dialkyl 2,5-furandicarboxylate with 1,4-butanediol to obtain a transesterification product and the subsequent polycondensation of the transesterification product and (ii) the esterification of 2,5-furandicarboxylic acid with 1,4-butanediol to obtain an esterification product and the subsequent polycondensation of the esterification product, wherein the polycondensation is carried out such that the poly (tetramethylene-2,5-furandicarboxylate) polycondensate has a number average molecular weight (Mn) of at least 10,000, as determined by Gel Permeation Chromatography (GPC) using polystyrene as standard, and has a content of carboxylic acid end groups of at most 50 meq/kg;

keeping the poly(tetramethylene-2,5-furandicarboxylate) polycondensate at a temperature in the range of 80 to 140° C. to obtain a semi-crystalline polycondensate; and subjecting the semi-crystalline polycondensate to solid-state polymerization by keeping the semi-crystalline polycondensate at a temperature of at least 140° C. and below its melting point, whilst the semi-crystalline polycondensate is either under a flow of inert gas or under vacuum to obtain the solid-state polymerized poly(tetramethylene-2,5-furandicarboxylate) polymer.

As indicated above, the content of carboxylic end groups (CEG) in the polycondensate can be relatively easily obtained below a value of 50 meq/kg by taking a dialkyl ester of 2,5-FDCA as starting material for the transesterification and subsequent polycondensation. The polycondensation will then typically result in a polycondensate with a content of carboxylic acid end groups of below 50 meq/kg. When the esterification uses 2,5-FDCA as starting material, the CEG content in the resulting polycondensate can exceed 50 meq/kg. By increasing the relative amount of 1,4-butanediol and/or by removing water formed during the esterification of FDCA and 1,4-butanediol the CEG content can be influenced. It has been found that in the process of the present invention it is advantageous to have a value for the CEG content that is relatively low. Good results are obtained when the PBF polycondensate has a CEG content in the range of 1 to 50 meq/kg. It is remarkable that in the case of PBF polycondensate it is advantageous to have a low CEG content. According to WO 2015/137807 a CEG content in poly(ethylene-2,5-furandicarboxylate) (PEF) polycondensate should not be too low in order to obtain a relatively fast solid-state polymerization. The CEG content in PEF polycondensate is suitably from 15 to 122 meq/kg. The CEG content in PBF polycondensate may be low, e.g. in the range of from 1 to 25 meq/kg, preferably from 1 to 15 meq/kg, and more preferably from 2 to 14 meq/kg. It is surprising that at such low CEG content the solid-state polymerization is optimized both as to polymerization rate and as to molecular weight attainable.

The poly(tetramethylene-2,5-furandicarboxylate) polycondensate has a number average molecular weight (Mn) of at least 10,000, as determined by Gel Permeation Chromatography (GPC) using polystyrene as standard. In this context it is observed that the determination of the Mn by GPC using polystyrene as standard yields different values from the determination of the Mn by GPC using polymethylmethacrylate (PMMA) as standard.

The present process is suitably carried out with a poly (tetramethylene-2,5-furandicarboxylate) polycondensate that has a Mn in the range of 10,000 to 35,000, preferably from 12,000 to 30,000, as determined by GPC using polystyrene as standard.

It has been found that the solid state polymerization proceeds smoothly when the poly(tetramethylene-2,5-furandicarboxylate) polycondensate is kept at a temperature in the range of 80 to 140° C. to obtain a semi-crystalline polycondensate. During this heating step the chains in the polycondensate rearrange and form a semi-crystalline polymer. Preferably, the poly(tetramethylene-2,5-furandicarboxylate) polycondensate is kept at a temperature in the range of 80 to 130° C. for a period in the range of 0.5 to 4 hours. The poly(tetramethylene-2,5-furandicarboxylate) polycondensate is suitably kept at ambient conditions. That implies that the pressure is not elevated or reduced. No specific measures as to the inertness of the atmosphere have to be taken. The atmosphere during this treatment can be air. No artificial flow of air or inert gas is required. Such a flow is suitably not carried out. Polymer crystallinity can be determined with Differential Scanning Calorimetry (DSC) by quantifying the heat associated with melting of the polymer. The heat can be reported as the percentage of crystallinity by normalizing the melting heat to that of a 100% crystalline sample. However, those samples are rare. Therefore, the crystallinity is often expressed as net enthalpy in terms of number of Joules per gram which number is derived from the DSC technique. The enthalpy of melting and crystallization can be determined in accordance with ISO 11357-3. The polycondensate used in the process according to the present invention is preferably kept at the temperature range indicated above for such a period that the semi-crystalline polycondensate thus formed has a crystallinity of 25 to 75 J/g, preferably 30 to 65 J/g, measured by Differential Scanning Calorimetry (DSC).

The semi-crystalline polycondensate having a certain degree of crystallinity also has a melting point Tm. The melting point of a polymer is easily determined by DSC and measured at the top of the endothermic peak. For the purpose of this invention the terms "melting point" and "Tm" refer to the temperature measured at the peak, in ISO-11357-3 referred to as the Tpm. When the DSC shows more than one peak, the melting point or Tm refers to the Tpm of the peak at the highest temperature. The ISO 11357-3 standard describes such a melting point determination. In accordance with this determination, the semi-crystalline polycondensate preferably has a melting point in the range of 165 to 175° C., as measured by Differential Scanning Calorimetry (DSC). It is observed that during the present process the melting point and crystallinity of the polycondensate will increase.

The semi-crystalline polycondensate thus obtained is subsequently subjected to solid state polymerization. Thereto it is kept at a temperature of at least 140° C. and below its melting point, whilst the semi-crystalline polycondensate is either under a flow of inert gas or under vacuum. Preferably, the semi-crystalline polycondensate is kept from 5 to 30° C. below its melting point during the solid-state polymerization. Typically that would entail that during the solid-state polymerization the semi-crystalline polycondensate is kept at a temperature in the range of 145 to 165° C. In one embodiment, the heating of the semi-crystalline polycondensate is carried out in vacuum, e.g. whilst maintaining a pressure level of 0.001 to 0.2 mbar. In a preferred other embodiment, during the solid state polymerization period the semi-crystalline polycondensate is heated whilst an inert gas is passed along the semi-crystalline polycondensate. The inert gas is suitably selected from nitrogen, helium, argon, neon, carbon dioxide and mixtures thereof. The inert gas suitably contains virtually no water vapor. Preferably, a flow of inert gas is applied as the use of a flow of inert gas typically favors a more effective removal of by-products than the use of vacuum. Especially tetrahydrofuran that may be formed from butanediol residues, and cyclic oligomers, which can form white dust or particulates in a melt processed article or in tooling used for melt processing, are removed more effectively by use of an inert gas flow.

Due to the obtaining of a semi-crystalline polycondensate and the indicated range of carboxylic end groups the rate at which the molecular weight increases during the solid state polymerization step is very advantageous. That means that, dependent on the desired end molecular weight, the solid state polymerization can be prolonged as long as the skilled person finds it desirable. Typically, the semi-crystalline polycondensate is kept at the temperature below its melting point for a period in the range of 2 to 120 hours, preferably 12 to 96 hours, during the solid state polymerization.

It has been found that the solid state polymerized polymers that are obtained in the process according to the present invention are very transparent and colorless. That is remarkable, as the polymers that are obtained in the process according to EP 1948709 are stated to have a light transmittance of 85%. Accordingly, these prior art polymers have a haze of 6.5% (both haze and light transmittance being determined in accordance with JIS K7105, which is equivalent to ASTM D1003). As the relationship between absorbance and light transmittance reads:absorbance=−log (percent transmittance/100), it appears that the absorbance of the polymers of EP1948709 is about 0.07.

The polymers prepared using the process according to the present invention have been subjected to an absorbance measurement at a concentration of 30 mg/mL in a mixture of dichloromethane and hexafluoroisopropanol in an 8:2 vol/vol ratio at a wavelength of 400 nm. These polymers show an improved optical property as shown by the absorbance compared with the prior art polymers. EP 1948709 also fails to indicate what measures can be applied to improve the absorbance. Therefore, it is surprising that the PBF polymers made according to this invention have this advantageous property.

Accordingly, the present invention also provides a poly (tetramethylene-2,5-furandicarboxylate) polymer, having a melting point in the range of 168 to 175° C. and a number average molecular weight (Mn) of at least 40,000, as determined by Gel Permeation Chromatography (GPC) using polystyrene as standard, and having an absorbance of at most 0.05, measured as described above. It is further surprising that these polymers have a polydispersity index of at most 3.0, suitably from 1.9 to 2.6, more preferably from 2.0 to 2.45. This indicates that the polymers prepared are more uniform than the PBF prepared according to US 2013/0171397. Nevertheless, the weight average molecular weight (Mw) of the polymers according to the present invention may be rather high. Values of Mw of above 135,000 are relatively easily attainable. Suitably the Mw of the polymers according to the invention is in the range of 100,000 to 250,000, preferably from 100,000 to 200,000, more preferably from 120,000 to 175,000, all measured by GPC and using polystyrene as standard.

The polymer can conveniently have a number average molecular weight of at least 45,000, preferably in the range of 45,000 to 80,000. The number average molecular weight may be adjusted by prolonging the solid state polymerization.

The absorbance can be very low. The value thereof may be influenced to some extent by the catalysts that are used in the polycondensation and/or the solid state polymerization. The absorbance is suitably in the range of 0.001 to 0.04.

The crystallinity of the polymers may suitably range from 30 to 85 J/g, preferably from 35 to 65 J/g, determined by DSC.

The polymers thus obtained have excellent mechanical properties. The polymers may be spun into fibers having an excellent tenacity. Monofilaments can be spun and the as-spun monofilaments can be drawn to ratios in the range of 2 to 10, preferably from 3 to 8 in one or more drawing steps, e.g. by using a hot pin. The monofilaments have an excellent tenacity. Tenacities in the range of 250 to 500 mN/tex, preferably from 300 to 400 mN/tex are attainable. The elongation at break may be in the range of 15 to 50%, e.g. from 20 to 45%. The crystallinity of the polymers in the fibers may be in the range of 30 to 70 J/g. The birefringence of the drawn fibers is higher than the fibers as spun. For instance, when a fiber is spun with a diameter of 196 µm it may have a birefringence ($\Delta n$) of 0.0016. When drawn with a draw ratio of 4 it may have a diameter of 104 µm and a birefringence of 0.1433. When drawn with a draw ratio of 2 the birefringence increased to 0.1237. This shows that fibers made from the polymers according to the invention may have a birefringence in the range of 0.2 to 0.001, depending on the draw ratios.

The polymers obtained have also excellent gas barrier properties. Therefore they are excellently suited for use as packaging material, e.g., films or containers, such as bottles. The polymers have a glass transition temperature in the range of 35 to 45° C. In non-oriented films, the polymer has better gas barrier properties than e.g. polybutylene terephthalate (PBT). The polymers have an oxygen permeability, expressed as ml (STP)·mil/100 in$^2$·day·atm at 23° C. and 50% relative humidity, of 1.6, compared to 6-7 for PBT. The water permeability is about the same for the polymers of the invention and for PBT, viz. 1.5 g·mil/100 in$^2$·day·atm at 38° C. and 100% relative humidity, for the polymers according to the invention, compared to 1.3 g·mil/100 in$^2$·day·atm for PBT. The $CO_2$ permeability is about 5.2 ml (STP)·mil/100 in$^2$·day·atm at 23° C. and 0% relative humidity. Since the mechanical properties and also the transparency properties of the polymers are excellent, the polymers are very suitable for packaging such as bottles and films.

The process and the polymers have been described with reference to poly(tetramethylene-2,5-furandicarboxylate) polymer. This polymer may consist of essentially only 2,5-furandicarboxylate groups and tetramethylene moieties. However, for the purpose of this application the polymer may also comprise minor amounts, e.g. up to 10 mol %, suitably up to 5 mol %, of one or more other dicarboxylic acid groups and diol moieties. Suitable dicarboxylic acid groups include the residues of terephthalic acid, isophthalic acid, phthalic acid, adipic acid, 2,4-furandicarboxylic acid, naphthalene dicarboxylic acid, azelaic acid, sebacic acid, 1,4-cyclohexane-dicarboxylic acid, succinic acid and mixtures thereof. Suitable diols include ethylene glycol, 1,3-propanediol, 1,6-hexanediol, 2,2-dimethyl-1,3-propanediol, isosorbide, It is, however, preferred that the poly(tetramethylene-2,5-furandicarboxylate) polymer substantially consist of 2,5-furandicarboxylate and tetramethylene moieties.

The invention will be illustrated by means of the following examples.

EXAMPLES

General Procedure

Into a 100 mL vessel, 13.8 g (75 mmol) dimethylfurandicarboxylate (DMF) and 12.8 g of 1,4-butanediol were introduced, meaning that the molar ratio of 1,4-BD:DMF was 1.9. Certain amounts of a transesterification and polycondensation catalyst were also added.

The admixture obtained was heated by means of a heated oil bath at a transesterification temperature. The transesterification temperature was 215° C. Methanol started to distil and was removed. When substantially all methyl groups have been replaced by hydroxybutyl groups, vacuum was applied to the vessel the temperature of the vessel was increased to about 225° C., and polycondensation started. The polycondensation was prolonged for 2.5 hours, unless otherwise indicated. The polycondensate obtained was cooled so that it became solid, crushed and sieved.

Polycondensate particles were subjected to a heating period of 2 hours at 110° C. for crystallization to obtain a semi-crystalline polycondensate.

After the crystallization the semi-crystalline polycondensate was subjected to solid state polymerization by keeping the semi-crystalline polycondensate at a temperature of 150° C. under a flow of nitrogen of 4 mL/min, the mL amount being measured at standard temperature and pressure. At different intervals of the solid state polymerization the number average molecular weight was determined.

Example 1

Four experiments were conducted using the general procedure above, with the use of titanium(IV)butoxide as catalyst in an amount of 0.02, 0.03 or 0.04 mol %, calculated as metal and based on the amount of DMF. The transesterification was continued for 4 hrs. Thereafter the polycondensation was started and continued a number of hours as indicated below. The polycondensation temperature was 240 or 225° C. The CEG content and the molecular weight (Mn and Mw, determined by CEG with polystyrene as standard) of the polycondensate were determined. The polycondensate was subjected to solid state polymerization (SSP) as described in the General Procedure. The Mw's and Mn's of the solid state polymerized polymers were determined after different periods of solid state polymerization. The polydispersity index (PDI) was calculated as Mw/Mn. The absorbances, measured at samples with a concentration of 30 mg/mL in a mixture of dichloromethane:hexafluoroisopropanol 8:2 (vol/vol) at 400 nm, of solid state polymerized polymers were also measured using a Heliosa (ThermoSpectronic) spectrophotometer.

Reaction conditions and results are shown in Table 1.

TABLE 1

|  | Exp. No. 1 | Exp. No. 2 | Exp. No. 3 | Ex. No. 4 |
| --- | --- | --- | --- | --- |
| Amount of catalyst, mol % | 0.02 | 0.02 | 0.03 | 0.04 |
| Transesterification period, hr | 4 | 4 | 4 | 4 |
| Polycondensation temp., ° C. | 240 | 225 | 225 | 225 |
| Polycondensation duration, h | 2.5 | 2 | 2 | 1.5 |
| CEG content, meq/kg | 58.8 | 22.6 | 18.2 | 19.2 |
| Mn at start of SSP | 30,000 | 33,300 | 29,800 | 27,000 |
| Mn after 24 h SSP | 30,900 | 44,700 | 45,400 | 40,800 |
| Mn after 48 h SSP | 31,800 | 53,100 | 54,900 | 51,400 |
| Mn after 72 h SSP | — | 58,100 | 59,700 | 55,300 |
| Mn after 96 h SSP | 33,200 | — | — | — |

TABLE 1-continued

|  | Exp. No. 1 | Exp. No. 2 | Exp. No. 3 | Ex. No. 4 |
|---|---|---|---|---|
| Mw at start of SSP | 79,000 | 86,000 | 70,700 | 61,400 |
| Mw after 24 h SSP | 76,900 | 97,200 | 102,500 | 88,400 |
| Mw after 48 h SSP | 79,600 | 121,300 | 130,400 | 111,300 |
| Mw after 72 h SSP | — | 135,900 | 137,000 | 126,800 |
| Mw after 96 h SSP | 83,000 | — | — | — |
| PDI after 72 h SSP | — | 2.34 | 2.29 | 2.29 |
| PDI after 96 h SSP | 2.50 | — | — | — |
| Absorbance after 72 h SSP | — | 0.007 | 0.009 | 0.013 |
| Absorbance after 96 h SSP | 0.019 | — | — | — |

Experiment No. 1 is a comparative experiment. It has a CEG content after polycondensation above 50 meq/kg. The other experiments have a CEG content below 50 meq/kg. Comparison between the results of Experiment Nos. 2-4 with those of Comparative Experiment No. 1 shows that the rate at which the SSP takes place is much higher and leads to higher molecular weights.

The results also show that the absorbance of the polymers of Experiment Nos. 2 to 4 is lower than that of the polymer of Comparative Experiment No. 1.

Example 2

To show the influence of polycondensation temperatures experiments were carried out, generally in accordance with the Experiment No. 4 described above. The transesterification period in each experiment was 4 h. The polycondensation temperatures were varied. It was found that at increasing temperatures not only the polycondensation rates increase, but that also the CEG content increases. The polycondensation duration was adapted so that the CEG content did not exceed the appropriate limit. The conditions and results are shown in Table 2 below.

TABLE 2

|  | Exp. No. 5 | Exp. No. 6 | Exp. No. 4 | Exp. No. 7 |
|---|---|---|---|---|
| Amount of catalyst, mol % | 0.04 | 0.04 | 0.04 | 0.04 |
| Polycondensation temp., ° C. | 205 | 215 | 225 | 240 |
| Polycondensation duration, h | 2.5 | 2 | 1.5 | 1.5 |
| CEG content, meq/kg | 9.7 | 24.8 | 19.2 | 26.3 |
| Mn at start of SSP | 16,600 | 32,200 | 27,000 | 27,900 |
| Mn after 24 h SSP | 29,500 | 45,400 | 45,400 | 39,500 |
| Mn after 48 h SSP | 34,300 | 54,200 | 51,400 | 50,400 |
| Mn after 72 h SSP | 37,300 | 57,000 | 55,300 | 52,600 |
| Mw at start of SSP | 34,100 | 79,300 | 61,400 | 69,300 |
| Mw after 24 h SSP | 60,000 | 102,500 | 88,400 | 87,500 |
| Mw after 48 h SSP | 75,800 | 122,500 | 111,300 | 115,500 |
| Mw after 72 h SSP | 86,300 | 135,600 | 126,800 | 120,300 |
| PDI after 72 h SSP | 2.31 | 2.38 | 2.29 | 2.29 |
| Absorbance after 72 h SSP | 0.002 | 0.010 | 0.013 | 0.017 |

Example 3

To show the performance of tin-containing transesterification and polycondensation catalysts five more experiments were carried. The reaction conditions were generally as described in the General Procedure. The catalysts used were butyltin(IV)tris(2-ethylhexanoate) ("Cat. 1"), dibutyltin(IV)dilaurate ("Cat 2"), tributyltin(IV)benzoate ("Cat 3"), tin(II)(2-ethylhexanoate) ("Cat 4") and tin(II)acetate ("Cat 5"). The reaction conditions and results are shown in Table 3.

TABLE 3

|  | Exp. No. 8 | Exp. No. 9 | Exp. No. 10 | Exp. No. 11 | Exp. No. 12 |
|---|---|---|---|---|---|
| Catalyst | Cat 1 | Cat 2 | Cat 3 | Cat 4 | Cat 5 |
| Amount catalyst, mol % | 0.12 | 0.12 | 0.12 | 0.12 | 0.12 |
| Transesterific. dur., hr | 4 | 4 | 4 | 4 | 4 |
| Polycondens. temp., ° C. | 225 | 225 | 225 | 225 | 225 |
| Polycondens. dur., h | 2.5 | 2.5 | 2.5 | 2.5 | 2.5 |
| CEG content, meq/kg | 8.9 | 14.1 | 11.0 | 15.5 | 15.7 |
| Mn at start of SSP | 22,900 | 30,100 | 28,500 | 22,900 | 29,300 |
| Mn after 24 h SSP | 37,600 | 41,200 | 48,000 | 48,200 | 60,600 |
| Mn after 48 h SSP | 45,000 | 47,300 | 49,100 | 53,400 | — |
| Mn after 72 h SSP | 45,900 | 51,500 | 55,900 | 60,100 | 69,200 |
| Absorbance at 72 h SSP | 0.017 | 0.017 | 0.014 | 0.039 | 0.030 |

Example 4

In a series of experiments 2,5-FDCA was subjected to polymerization with 1,4-butanediol (1,4-BD) in the presence of 0.04 mol % titanium(IV)butoxide, calculated as metal and based on the molar amount of 2,5-FDCA. The 2,5-FDCA was mixed with an amount of 1,4-butanediol and catalyst at 175° C. The result was a slurry of solid 2,5-FDCA in 1,4-butanediol. Water evolved and was removed. When the mixture became clear after about 4 hours, the mixture was further gradually heated for another 3 hours and maintained for over an hour at the final esterification temperature of 205° C. The polycondensation was carried out as described in the General Procedure at 225° C. for 2.5 hours. The polycondensate thus obtained was cooled so that it became solid, it was crushed and sieved.

Polycondensate particles were subjected to a heating period of 2 hours at 110° C. for crystallization to obtain a semi-crystalline polycondensate.

After the crystallization the semi-crystalline polycondensate was kept at a temperature of 150° C. under a flow of nitrogen of 4 mL/min to achieve solid state polymerization.

The CEG content and the Mn of the polycondensate were determined. Also the Mn's at various stages of solid state polymerization were determined. Finally, the absorbance of solid state polymerized polymer was measured as described above. The PDI of the polycondensates and solid-state polymerized polyesters in both experiments was below 3.0.

Other reaction conditions and results are shown in Table 4.

TABLE 4

|  | Exp. No. 13 | Exp. No. 14 |
|---|---|---|
| Ratio 2,5-FDCA/1,4-BD | 1:3 | 1:2.5 |
| CEG content, meq/kg | 22.9 | 70.9 |
| Mn at start of SSP | 31,800 | 23,100 |
| Mn after 24 h SSP | 38,400 | 31,500 |
| Mn after 48 h SSP | 44,500 | 33,100 |
| Mn after 72 h SSP | 48,700 | 35,900 |
| Absorbance at 72 h SSP | 0.016 | 0.030 |

Experiment No. 14 is a comparative experiment, wherein the polycondensate has a CEG content above 50. The results show that the SSP process of Exp. No. 13 results is a faster increase of molecular weight, leads to higher final molecular weights and yield polymers with a lower absorbance than the SSP process in Exp. No. 14.

The invention claimed is:

1. A process for the production of a solid-state polymerized poly(tetramethylene-2,5-furandicarboxylate) polymer comprising:
providing a poly (tetramethylene-2,5-furandicarboxylate) polycondensate having a number average molecular weight (Mn) of at least 10,000, as determined by Gel Permeation Chromatography (GPC) using polystyrene as standard, and having a content of carboxylic acid end groups of at most 50 meq/kg; and
keeping the poly(tetramethylene-2,5-furandicarboxylate) polycondensate at a temperature in the range of 80 to 140° C. to obtain a semi-crystalline polycondensate; and
subjecting the semi-crystalline polycondensate to solid-state polymerization by keeping the semi-crystalline polycondensate at a temperature of at least 140° C. and below its melting point, whilst the semi-crystalline polycondensate is either under a flow of inert gas or under vacuum to obtain the solid-state polymerized poly(tetramethylene-2,5-furandicarboxylate) polymer having an absorbance of at most 0.05, measured at a concentration of 30 mg/mL in a mixture of dichloromethane and hexafluoroisopropanol in an 8:2 vol/vol ratio at a wavelength of 400 nm.

2. The process according to claim 1, wherein the poly (tetramethylene-2,5-furan dicarboxylate) polycondensate has a content of carboxylic end groups in the range of 1 to 50 meq/kg.

3. The process according to claim 1, wherein the poly (tetramethylene-2,5-furan dicarboxylate) polycondensate has a content of carboxylic end groups in the range of from 1 to 25 meq/kg.

4. The process according to claim 1, wherein the poly (tetramethylene-2,5-furandicarboxylate) polycondensate has a Mn in the range of 10,000 to 35,000.

5. The process according to claim 1, wherein the poly (tetramethylene-2,5-furan dicarboxylate) polycondensate has been obtained from one of the methods selected from the group consisting of (i) the transesterification of a dialkyl 2,5-furandicarboxylate with 1,4-butanediol to obtain a transesterification product and the subsequent polycondensation of the transesterification product and (ii) the esterification of 2,5-furandicarboxylic acid with 1,4-butanediol to obtain an esterification product and the subsequent polycondensation of the esterification product.

6. The process according to claim 1, wherein the poly (tetramethylene-2,5-furandicarboxylate) polycondensate is kept at a temperature in the range of 80 to 130° C. for a period in the range of 0.5 to 4 hours.

7. The process according to claim 1, wherein the semi-crystalline polycondensate has a crystallinity in the range of 25 to 65 J/g, measured by Differential Scanning calorimetry (DSC).

8. The process according to claim 1, wherein during the solid-state polymerization the semi-crystalline polycondensate is kept at a temperature of from 5 to 30° C. below its melting point.

9. The process according to claim 1, wherein during the solid-state polymerization the semi-crystalline polycondensate is kept at a temperature in the range of 145 to 165° C.

10. The process according to claim 1, wherein the semi-crystalline polycondensate is kept at the temperature below its melting point for a period in the range of 2 to 120 hours.

11. A poly(tetramethylene-2,5-furandicarboxylate) polymer, having a melting point in the range of 168 to 175° C. and a number average molecular weight (Mn) of at least 40,000, as determined by Gel Permeation Chromatography (GPC) using polystyrene as standard, and having an absorbance of at most 0.05, measured at a concentration of 30 mg/mL in a mixture of dichloromethane and hexafluoroisopropanol in an 8:2 vol/vol ratio at a wavelength of 400 nm.

12. The poly(tetramethylene-2,5-furandicarboxylate) polymer according to claim 11, which has an Mn in the range of 45,000 to 80,000, as determined by Gel Permeation Chromatography (GPC) using polystyrene as standard.

13. The poly(tetramethylene-2,5-furandicarboxylate)) polymer according to claim 11, which has a polydispersity index (PDI) from 1.9 to 2.6.

14. The poly(tetramethylene-2,5-furandicarboxylate) polymer according to claim 11, which has an absorbance in the range of 0.001 to 0.04.

15. The poly(tetramethylene-2,5-furandicarboxylate) polymer according to claim 11, which has a crystallinity of 30 to 85 J/g, measured by Differential Scanning Calorimetry (DSC).

* * * * *